Nov. 27, 1934.    G. WÜNSCH    1,982,564
APPARATUS FOR REGULATING THE OPERATION OF CONVEYERS
Filed March 4, 1931    2 Sheets-Sheet 1
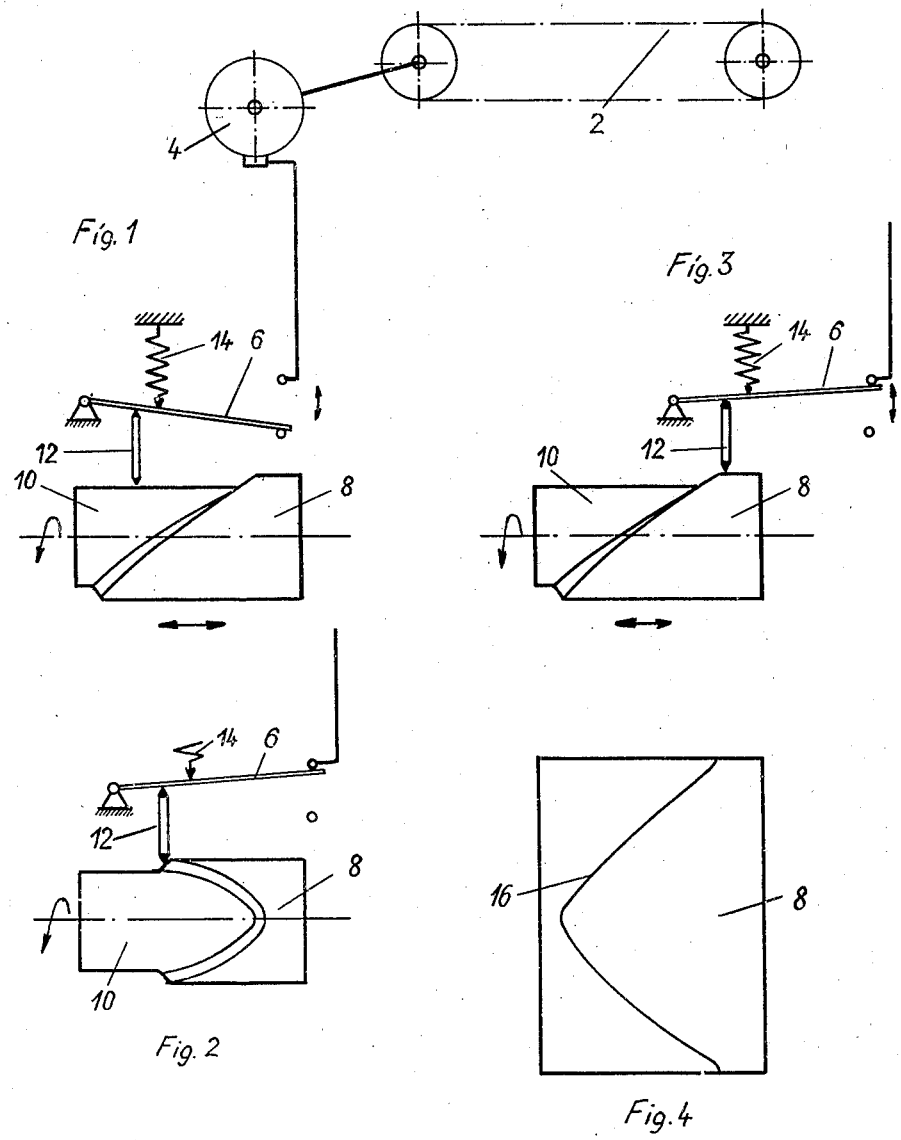

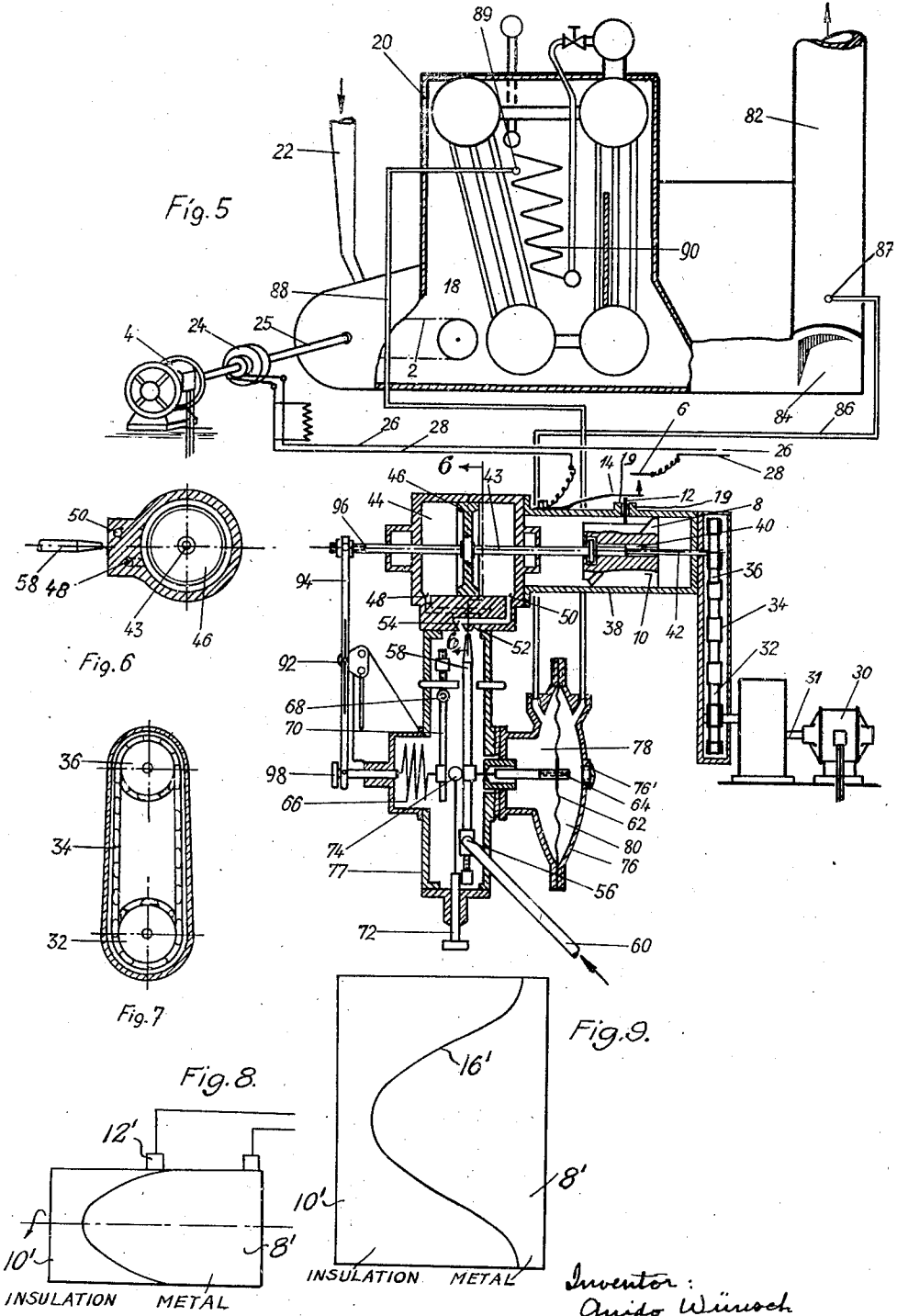

Patented Nov. 27, 1934

1,982,564

UNITED STATES PATENT OFFICE 1,982,564

APPARATUS FOR REGULATING THE OPERATION OF CONVEYERS

Guido Wünsch, Berlin-Steglitz, Germany, assignor to Askania-Werke Aktiengesellschaft, Berlin-Friedenau, Germany, a corporation of Germany Application March 4, 1931, Serial No. 520,104
In Germany March 7, 1930

17 Claims. (Cl. 110—40)

This invention relates to apparatus for regulating or governing the speed of conveyers, and more particularly the feed speed of travelling grates, screw conveyers for coal dust furnaces, and the like.

For regulating or governing the fuel feed in the case of travelling grates or coal dust furnaces, it has heretofore been proposed to drive the fuel feed operating motor at uniform speed and to effect the regulation or governing by alternately starting and stopping the motor, the ratio between the time the motor is operative and the time it is at rest being varied by a suitable regulating or governing impulse. The starting and stopping of the driving motor has heretofore been effected by means of a cam disk, rotated by an adjustable auxiliary electric motor, in cooperation with a time switch. At each revolution of the cam disk a switch controlling the driving motor is thrown in, to be thrown out again after a given time by said time switch. The number of revolutions of the cam disk thus determines the ratio between the time the driving motor is thrown in and the time it is thrown out, so that the desired regulation is obtained by control of the number of revolutions of the auxiliary motor by the regulating or governing impulse. The wide limits within which the number of revolutions of the auxiliary motor must be adjustable constitute a distinct disadvantage in this method of regulation and a serious objection thereto, even though it be simpler to regulate the number of revolutions of a smaller auxiliary motor than of the heavy feed motor. There are also other disadvantages connected with said regulating methods as heretofore used. If for example the fuel feed is to be regulated according to the amount of air supplied for combustion, the regulating or governing impulse is most conveniently derived from the difference in pressure at the front and back of a suitable baffle or screen provided in the combustion air supply passage. This pressure differential however is proportional to the square of the amount of air or combustion gases flowing through said furnace. Consequently the number of revolutions of the fuel feed motor must be regulated proportionally to the square root of said pressure differential, in order that said number of revolutions and consequently the fuel feed to be regulated, shall be proportional to the amount of air supplied for combustion. But in order that the regulated number of revolutions shall be proportional to the square root of the regulating or governing impulse within the wide limits required, very complex intermediate connections are necessary which makes for very serious objections.

These and other disadvantages and objections are overcome by the present invention.

The invention and its aims and objects will be best understood from the following description, taken in connection with the accompanying drawings of an embodiment of the invention herein given for illustrative purposes, the true scope of the invention being more particularly set forth in the appended claims.

The invention contemplates among other things the provision of controlling means to control the starting and stopping of the fuel feed motor, said means herein comprising a controlling member and a member cooperating therewith, said two members being relatively movable. In accordance with the invention said two members may be of any suitable construction and mode of operation. For example, said controlling member may have its operative surface in part of conductive and in part of non-conductive material, in which case its cooperating member will comprise a contact for said surface, so that by suitable relative movement of said two members, electrical contact may be established and interrupted to start and stop the fuel feed motor through suitable electrical connections. Or said controlling member may comprise a cam member for operating a switch in the circuit of the fuel feed motor, in which case the cooperating member will be a follower. The regulating or governing impulse is rendered effective in the simplest manner by relative movement of the controlling member and its cooperating member, by relative axial movement for example of said controlling member and its cooperating member. The shape of the developed raised portion of the controlling member will vary according to the factor or factors in function of which the regulating or governing impulse adjusts the period of action and inaction of the fuel feed motor. If, for example, the fuel feed is to be regulated or governed proportionally to the air supply, and by the aid of the pressure differential between that in front of and that behind a suitable screen or partition located in the air supply passage, the raised portion of the controlling member should be so formed that when said controlling member is developed the edge of said raised portion shall have substantially the shape of a parabola, having its axis extending parallel to the lateral surface of said controlling member. In such case, in view of the geometrical characteristics of a parabola, the path of axial displacement of said controlling member will be proportional to the square of the operative period of the feeding means, and as the pressure differential is proportional to the square of the quantity of air flowing through the obstructing screen or partition, proportionally between air supply and fuel feed is secured by the arrangement described.

In the drawings:

Fig. 1 is a diagrammatic view of a controlling member, a travelling grate and its driving motor and electrical connections between said controlling member and said motor;

Figs. 2 and 3 are similar views, showing the controlling member in different positions, the travelling grate and its motor being omitted;

Fig. 4 shows the controlling member and its raised portion developed; and

Fig. 5 is a view more in detail of an illustrative embodiment of the invention.

Fig. 6 is a sectional detail on line 6—6 of Fig. 5.

Fig. 7 is a lateral elevation of the sprockets 32 and 36 and connecting chain 34;

Fig. 8 is a diagrammatic view of a modified form of control member; and Fig. 9 is a developed view of the control member shown in Fig. 8.

Referring first to Figs. 1 to 4, a travelling grate is shown at 2, said grate being driven by an electric motor of conventional construction 4 operating at uniform speed and driven from any suitable conventional source of power (not shown). Said motor is rendered operative and inoperative by the closing and opening of a switch 6 in its circuit, a raised portion 8 on a rotary cylindrical cam member 10 acting through a suitable follower 12 to close said switch, and a spring 14 to open the same when said follower leaves said raised portion 8 to engage the unraised portion of said cam member 10 in the rotation of the latter. Said cam member is rotated at uniform speed by a uniformly driven electric motor 30 (Fig. 5), driven from any suitable conventional source of energy (not shown). If said cam member 10 and its raised portion 8 be developed as shown in Fig. 4 it will be seen that said raised portion 8 is limited by a curved line 16 of substantially parabolic shape. It will be apparent to those skilled in the art that by axial displacement of said cam member 10 any desired ratio between the time during which said switch 6 is thrown in and that during which it is thrown out may be obtained. If said cam member be moved or adjusted axially to the extreme left, referring to Fig. 3, said follower 12 will remain continuously in contact with said raised portion 8 and the switch will remain continuously closed, while if said cam member be moved or adjusted to the extreme right relative to its follower, said follower will not engage said raised portion 8 at all and said switch will remain continuously open. In each position of said cam member intermediate said two extreme end positions, said follower in the illustrative embodiment of the invention will be raised and lowered once in the course of each revolution of said cam member said follower being held against movement axially of said cam member 10 by stops 19 or other suitable means where it passes through the casing 38, see Fig. 5. In the first case the switch will be closed, in the second opened. The time during which the switch will remain closed will be proportionally greater compared to the time during which it will remain open, the further said cam member be moved or adjusted to the left, viewing Figs. 1 to 3. If the edge 16 of the raised portion 8 of the cam member 10 be in fact of substantially parabolic shape, it will be evident that the period during which the switch remains closed, which is proportional to the ordinate of the curve, will be proportional to the square of the axial displacement of said cam member. The parabolic shape of the edge 16 of said raised portion 8 therefore secures in fact proportionality between air supply and fuel feed, assuming that the adjusting or regulating impulse for displacing the cam member 10 axially be derived from the pressure differential between the pressure extant in front of and behind a suitable obstructing screen or partition suitably located in the combustion air supply passage.

It will be apparent that within the scope of the invention said raised portion 8, instead of controlling a motor 4, could control any other suitable means to the same end, a clutch for example located intermediate said motor and the fuel feed means, (grate 2), said motor being continuously driven. Preferably, though not necessarily, said clutch will be an electromagnetic clutch, so that it could be thrown in and out in the same manner that said motor 4 is thrown into and out of operation. It will also be apparent that the cam surface 16 could be of any other form required to produce any desired relation between the regulating or governing impulse and the fuel feed. As already suggested, and referring to Figs. 8 and 9 it will be within the scope of the invention to make the operative surface of the controlling member of conductive material 8' and non-conductive material 10', the conductive and non-conductive parts meeting along a curved line 16' shaped correspondingly to the line 16. Said controlling member and cooperating contact 12' would be inserted in the circuit supplying said motor 4, so that in passing from the conductive to the non-conductive sections of said controlling member surface the motor would be stopped, and vice versa. It will be apparent that either the controlling member or its cooperating member could be moved by the regulating or governing impulse, also to control the fuel feed.

A particular advantage possessed by the present invention results from the fact that the speed of revolution of the controlling member has no effect upon the average feed speed, as the latter is dependent solely upon the relation of the time the cam surface is operative to the time it is inoperative, that is to say on the position of the controlling member relative to the cooperating member to be operated thereby.

Referring to Fig. 5, I will now describe a more detailed illustrative embodiment of the invention therein shown. The combustion chamber for a boiler 20 in a travelling grate furnace is indicated at 18. The travelling grate 2 is driven by an electric motor 4, coal being supplied to said grate in a well known manner by a feed hopper (not shown) built in at 22. In this illustrative embodiment of the invention, the fuel feed is to be regulated or governed in such manner that the ratio of combustion air and fuel shall remain constant. In order to be able to adjust the mean feed of fuel by the travelling grate to correspond to the air supplied for combustion without varying the number of revolutions of the driving motor 4, there is provided, intermediate said motor and said travelling grate an electrical clutch 24 of any well known conventional type which is thrown in and out by a separate continuously operative switch 6. The mean fuel feed speed of the travelling grate 2 and consequently the mean fuel feed will thus be determined by the ratio of the time the switch is thrown in to the time it is thrown out, that is to say, the time during which the clutch 24 connects the motor 4 to the travelling grate and the time during which this connection is broken. The switch 6 is operated by a raised portion 8 on a cylindrical cam member 10, shown in detail in Figs. 1 to 4, a follower 12 being in continuously yielding engagement with said cam 10 or its raised portion 8 as said cam rotates, so that through said follower, which, as already stated, is held against movement axially of said cam 10, in the illustrative embodiment of the invention, said switch 6 will be closed and opened once during each revolution of said cylinder. Each time said switch is closed said electromagnetic clutch 24 receives current through conductors 26 and 28 and is thrown in, thus connecting the driving motor 4 with the travelling grate 2 through shaft 25 and conventional well known connections which it is unnecessary to describe. The conductors 26, 28 are supplied with current from any well known conventional source (not shown). When the switch 6 is open, current is cut off from the conductors 26 and 28, the clutch 24 is thrown out the motor 4 runs idle and the travel of the travelling grate 2 is arrested. Rotation of the cam cylinder 10 is effected by a motor 30, shaft 31, chain 34, sprocket 32, sprocket wheel 36 and shaft 42, said cam 10 being splined on said shaft at 40 so that said cam can move axially relative to said shaft within a casing 38 but is constrained to rotate with said shaft. Said motor may be driven from any suitable conventional source of power (not shown). One end of the piston rod 43 of a piston 46 operating in a cylinder 44 is suitably connected to the left end of said cam cylinder 10, said cylinder forming part of the illustrative means for transmitting the regulating or governing impulse to said cam cylinder. Channels 48, 50 open into opposite ends of said cylinder and communicate with exterior ports 52, 54 provided in the lateral wall of said cylinder, said ports being in the same plane, but one of said channels 48, 50, passing behind the other, as clearly shown in Figs. 5 and 6. A nozzle 58 pivoted at 56 for swinging movement to cause its discharge opening to play in front of said ports 52, 54 in the plane in which said ports are contained is continuously supplied with fluid under pressure from any suitable conventional source of supply by pipe 60 preferably air or oil. If the discharge opening of the nozzle 58 be located half-way between the too closely adjacent ports 52, 54, said ports will be equally supplied with pressure fluid from said nozzle and the pressure upon opposite sides of the piston 46 in cylinder 44 will be equal. If the nozzle be swung to the right, pressure at the left side of the piston 46 will increase and pressure at the right side thereof will diminish, so that the cam cylinder 10 will be moved to the right. If the nozzle is swung to the left pressure at the right of the piston 46 will increase and pressure at the left thereof will diminish and the cam cylinder will thus be moved to the left.

As in the illustrative embodiment of the invention it is proposed to make use of a pressure differential created in the apparatus to produce the regulating impulse to be communicated to the regulating member 10, suitable means are herein provided for that purpose. Said means herein conveniently comprises a suitable diaphragm casing 76 containing a diaphragm 62 which divides the interior of said casing into two airtight chambers 78 and 80. To the center of the diaphragm 62 is suitably secured one end of a rod 64 guided for longitudinal movement in suitable air-tight openings provided in the wall of the diaphragm casing 76 and a casing 77 enclosing the nozzle 58. A screw threaded plug 76' gives access to the interior of said diaphragm chamber 76 for repairs, adjustment, etc. The free end of said rod 64 engages one side of the nozzle 58 intermediate its fulcrum 56 and its free end. Upon its opposite side, said nozzle 58 is acted upon by a spring 66 through a lever fulcrumed at 68 and numbered 70, and through an adjustable transmission member 74 carried by a rod 72 having sliding engagement with a bore provided in the end wall of said casing 77, for variably adjusting said transmission member 74 lengthwise the lever 70 to vary the ratio of the two arms of the lever 70 and hence the throw imparted to said nozzle 58. The adjusting member may be termed a ratio slider. When it is moved upward above the position shown, it will increase the action of the spring and thereby require more differential pressure on the diaphragm to obtain the lateral movement of the cam 8. The effect is to reduce the ratio of fuel to air. If the slider is moved downward the ratio of fuel to air is increased. The diaphragm chamber 78 is in communication, by means of a passage 86 (herein diagrammatically represented) with the flue 84 connecting the combustion chamber 18 with the chimney 82. A second passage 88 (also diagrammatically represented) connects the diaphragm chamber 80 with another part of the combustion chamber 18. Between the starting points 87 and 89 of said passages 86 and 88, respectively, suitable means are provided for creating a pressure differential at the two points 87 and 89, said means herein conveniently comprising the superheating pipe 90 of any suitable conventional construction and other obstructions which obstruct or dam up, so to speak, the combustion gases passing off through the flue 84 and chimney 82. The pressure differential at the two points 87 and 89 is therefore proportional to the square of the quantity of combustion air. Consequently, the pressure differential within the diaphragm chamber 78, 80 is also proportional to the square of the quantity of combustion air, so that on changing the quantity of combustion air, the nozzle 58 undergoes a deviation which is proportional to the change in the square of the quantity of combustion air.

The piston 46 is connected by its piston rod 96 to one end of lever 94 fulcrumed at 92. The other end of said lever 94 is pivotally connected to the outer end of a rod 98 having its inner end connected to the left end of spring 66. Said rod 98 is slidingly mounted in a bore or bearing provided in the wall of the casing 77.

The above described illustrative embodiment of the invention operates as follows:

If for any reason the draft in the flue 84 be increased, so that a greater quantity of combustion air passes through the furnace and the pressure differential in the diaphragm chambers 78 and 80 thus increases, the diaphragm 62 will be bent toward the left. This swings nozzle 58 toward the left compressing spring 66. As a result port 54 receives more pressure oil from said nozzle than port 52. Piston 46 will thus be moved toward the left carrying with it the regulating member 10. Simultaneously lever 94 will be turned contraclockwise by piston rod 96 and spring 66 will be more compressed, which tends to swing nozzle 58 in the opposite direction. Said nozzle therefore comes to rest with its discharge opening in a median position relative to the two ports in which the differential pressure acting upon the diaphragm 62 counterbalances the new tension of spring 66. In this position the follower 12 which actuates the switch 6 engages the regulating member 10 at a point longitudinally thereof where the cross-sectional sector of the cam 8 is longer than formerly. Consequently in this position of the parts said cam 8 will keep the switch 6 closed for a longer period of time during one revolution of said regulating member, than before, the time during which said switch remains open during said revolution being proportionally shorter. In exactly the same manner, the ratio of the time during which the clutch 24 connects the travelling grate 2 to the motor 4, to the time during which said grate is disconnected from said motor, will be varied. It follows therefore that the mean feed speed of the travelling grate 2 and consequently the mean fuel feed will also be increased correspondingly to the changed air supply. On the other hand, if the pressure differential acting on the diaphragm 62 drops in consequence of a reduced air supply, the mean fuel supply will in a corresponding manner be reduced. As the line limiting the cam 8 is of parabolic shape, as shown at 16, Fig. 4, the variation in the time during which the clutch 24 is thrown in, as determined by axial displacement of the regulating member 10 and its cam 8, will be proportional to the square root of the length of said displacement, and consequently proportional also to the square root of the pressure differential, so that the fuel feed will be directly proportional to the variation in the air supply.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

I claim:

1. Apparatus for regulating or governing the operation of conveyers, more particularly of fuel feeding means for furnaces comprising, in combination, fuel feeding means; driving means therefor; controlling means to render said driving means operative and inoperative to drive said fuel feeding means and to vary the duration of the operative and inoperative periods thereof, said controlling means comprising a rotary and axially movable cam member, the cam surface of said cam member comprising a raised portion which when said cam surface is developed is limited by a line of parabolic shape 2. Apparatus for regulating or governing the operation of conveyers, more particularly of fuel feeding means for furnaces comprising, in combination, fuel feeding means; driving means therefor; controlling means to render said driving means operative and inoperative to drive said fuel feeding means and to vary the duration of the operative and inoperative periods thereof, said controlling means comprising a relatively movable cam member and cooperating follower, the cam surface of said cam member comprising a raised portion which when said cam surface is developed is limited by a line of parabolic shape.

3. Apparatus for regulating or governing the operation of conveyers, more particularly of fuel feeding means for furnaces comprising, in combination, fuel feeding means; driving means therefor; controlling means to render said driving means operative and inoperative to drive said fuel feeding means and to vary the duration of the operative and inoperative periods thereof, said controlling means comprising a relatively movable controlling member and cooperating follow-contact, the operative surface of said controlling member with which said follower-contact cooperates being cylindrical and comprising two sections the one electrically conductive, the other not, said two sections being joined along a line which when said operative surface is developed is of parabolic shape.

4. Apparatus for regulating or governing the operation of conveyers, more particularly of fuel feeding means for furnaces, comprising in combination, a furnace having fuel feeding means; driving means therefor; means comprising a cam member and cooperating follower relatively movable to render said driving means operative and inoperative; and means operable in response to variations in the pressure drop in the furnace connected to move said cam member relative to said follower to vary the duration of the operative periods of the conveyer.

5. Apparatus for regulating or governing the operation of conveyers, more particularly of fuel feeding means for furnaces, comprising in combination, a furnace having fuel feeding means; means intermittently to drive said fuel feeding means; means, comprising a controlling member and cooperating follower relatively movable to vary the duration of the periods during which said fuel feeding means is driven by said driving means; and means operative in response to variations in the pressure drop in the furnace connected relatively to move said controlling member and follower for that purpose.

6. Apparatus for regulating or governing the operation of conveyers, more particularly of fuel feeding means for furnaces, comprising in combination, a furnace having fuel feeding means; means connected intermittently to drive said fuel feeding means; means comprising a controlling member and cooperating follower, relatively movable to vary the duration of the periods during which said fuel feeding means is driven by said driving means; pressure responsive means connected to the furnace to be operated by the pressure drop therein; and means controlled by said pressure responsive means to relatively move said controlling member and follower.

7. Apparatus for regulating or governing the operation of conveyers, more particularly of fuel feeding means for furnaces, comprising in combination, a furnace having fuel feeding means; driving means therefor; controlling means to render said driving means operative and inoperative to drive said fuel feeding means and to vary the duration of the operative and inoperative periods thereof, said controlling means comprising a relatively movable cam member and cooperating follower; and means to move the cam on its axis in response to variations in the pressure drop within the furnace.

8. Apparatus for regulating or governing the operation of conveyers, more particularly of fuel feeding means for furnaces, comprising in combination, a furnace having fuel feeding means; driving means therefor; means to render said driving means operative and inoperative to drive said fuel feeding means; means responsive to variations in pressure differentials to vary the duration of the operative and inoperative periods of said driving means; and conduits connected at spaced points to said furnace to act on said pressure differential responsive means.

9. Apparatus for regulating or governing the operation of conveyers, more particularly of fuel feeding means for furnaces comprising, in combination, a furnace having fuel feeding means; driving means therefor; means to render said driving means operative and inoperative comprising a cam member and cooperating follower therefor, said cam member presenting to said follower two concentric contact surfaces the one operative and the other inoperative to actuate said follower, the transverse area of said surfaces respectively increasing and decreasing progressively in opposite directions lengthwise of said cam member; means to rotate said cam member relatively to said follower to cause said contact surfaces to act successively upon said follower, thus alternately to render said driving means operative and inoperative; and means to move said cam member relative to said follower to cause different transverse areas of said contact surfaces to act upon said follower, thereby to vary the duration of the operative and inoperative periods of said driving means.

10. Apparatus for regulating or governing the operation of conveyers, more particularly of fuel feeding means for furnaces comprising, in combination, fuel feeding means; driving means therefor; means to render said driving means operative and inoperative comprising a member and cooperating device relatively movable transversely and longitudinally of said member, said member presenting to said device two contact surfaces the one operative and the other inoperative to actuate said device, the transverse areas of said surfaces respectively increasing and decreasing progressively in opposite directions lengthwise of said member; means relatively to move said member and device to cause said surfaces alternately to act upon said device, thus alternately to render said driving means operative and inoperative; and means relatively to adjust said member and said device longitudinally of said member to cause different transverse areas of said surfaces to act upon said device, thereby to vary the duration of the operative and inoperative periods of said driving means.

11. Apparatus for regulating or governing the operation of conveyers, more particularly of fuel feeding means for furnaces comprising, in combination, a furnace having fuel feeding means; driving means therefor; controlling means for said driving means; means to operate said controlling means to render said driving means operative and inoperative; a device operable by a pressure differential in said furnace; and means responsive to variations in said pressure differential to operate said controlling means to vary the duration of the operative and inoperative periods of said driving means.

12. Apparatus for regulating or governing the operation of conveyers, more particularly of fuel feeding means for furnaces comprising, in combination, a furnace having fuel feeding means; driving means therefor; controlling means for said driving means; means to operate said controlling means to render said driving means operative and inoperative; a governing device operable by a pressure differential in said furnace; and fluid pressure operated means, controlled by said governing device, to operate said controlling means to vary the duration of the operative and inoperative periods of said driving means.

13. Apparatus for regulating or governing the operation of conveyers, more particularly of fuel feeding means for furnaces comprising, in combination, fuel feeding means; driving means for said feeding means comprising an electrical motor; a controlling switch operative to connect and disconnect said motor from said fuel feeding means; switch controlling means comprising a cam member and cooperating follower therefor, said cam member presenting to said follower two concentric contact surfaces the one operative and the other inoperative to actuate said follower, the transverse areas of said surfaces respectively increasing and decreasing progressively in opposite directions lengthwise of said cam member; means to rotate said cam member relatively to its follower to cause said contact surfaces to act successively upon said follower, thus alternately to close and open said switch; and means axially to adjust said cam member relatively to said follower to cause different transverse areas of said contact surfaces to act upon said follower, thereby to vary the duration of the periods during which said switch is closed and open.

14. Apparatus for regulating or governing the operation of conveyers, more particularly of fuel feeding means for furnaces, comprising, in combination, fuel feeding means; driving means for said fuel feeding means; a clutch intermediate said fuel feeding means and said driving means; clutch controlling means comprising a cam member and cooperating follower therefor, said cam member presenting to said follower two concentric contact surfaces, the one operative and the other inoperative to actuate said follower, the transverse areas of said surfaces respectively increasing and decreasing progressively in opposite directions lengthwise of said member; means to rotate said cam member relatively to said follower to cause said contact surfaces to act successively upon said follower, and thereby control the actuation of said clutch so that it is alternately thrown in and out; and means axially to adjust said cam member relatively to said follower to cause different transverse areas of said contact surfaces to act upon said follower, thereby to vary the duration of the periods during which said clutch remains thrown in and out.

15. In combination with a furnace, a fuel conveyer, a constant speed motor for operating said conveyer; a clutch for connecting and disconnecting the motor from said conveyer; means operable in response to variations in the pressure differential created by the flow of products of combustion in said furnace to control said clutch and vary the duration of the periods of rest and travel of the conveyer to produce a required ratio between the air and the fuel supplied to the furnace.

16. In combination with a furnace, a fuel conveyer, a constant speed motor for operating said conveyer; a clutch for connecting and disconnecting the motor from said conveyer; means operable in response to variations in the pressure differential created by the flow of products of combination in said furnace to control said clutch and vary the duration of the periods of rest and travel of the conveyer to produce a required ratio between the air and the fuel supplied to the furnace; and adjustable means operable to vary the ratio of fuel and air.

17. In combination with a furnace, means to supply fuel intermittently thereto; pressure responsive means connected to be operated by variations in the pressure drop of the air or gases passing through the furnace; and controlling apparatus governed by said pressure responsive means connected to vary the duration of the fuel feeding intervals and thereby maintain a predetermined ratio between fuel and air supplied to the furnace.

GUIDO WÜNSCH.